March 12, 1968

G. L. CLARK ETAL

3,373,376

KERR CELL LASER MODULATOR CORRECTED FOR INDUCED
CHANGES OF INDEX OF REFRACTION EFFECTS

Filed Nov. 18, 1963

INVENTORS
GEORGE L. CLARK
RALPH F. WUERKER
BY
ATTORNEY

George L. Clark
Ralph F. Wuerker
INVENTORS

United States Patent Office 3,373,376
Patented Mar. 12, 1968

3,373,376
KERR CELL LASER MODULATOR CORRECTED FOR INDUCED CHANGES OF INDEX OF REFRACTION EFFECTS
George L. Clark, Sierra Madre, and Ralph F. Wuerker, Palos Verdes, Calif., assignors to TRW Inc., a corporation of Ohio
Filed Nov. 18, 1963, Ser. No. 324,289
10 Claims. (Cl. 331—94.5)

ABSTRACT OF THE DISCLOSURE

An electrical shutter having electrically orientable optically anisotropic molecules is interposed between the radiation reflecting elements of a master system, defining a cavity, so as to control the level of radiation between the reflecting elements. A prism is interposed in the cavity to plane polarize the reflecting radiation. A quarter wave plate also interposed in the cavity elliptically or circularly polarizes the plane-polarized radiation from the quarter wave plate such that only elliptical or circular polarized radiation passes through the electrical shutter effectively preventing changes in the index of refraction of the shutter due to radiation induced orientation of the molecules of the shutter.

---

The present invention relates to a system for generating coherent electromagnetic radiation within the optical wavelength ranges, and more particularly to improved apparatus of the optical maser type for generation of optical frequency radiation at multimegawatt power levels. As used in connection with the present invention, the term "optical frequency radiation" is intended to define radiation within a portion of the electromagnetic spectrum extending from the farthest infrared to and including the ultraviolet and encompassing a wavelength range from about $2 \times 10^6$ angstroms to about 2000 angstroms.

It is well known that intense optical wavelength radiation may be generated and amplified in systems which normally include both an optical resonator (or cavity) and an optically active maser medium. An essential require of such systems is that the cavity attenuation must be lower than the power gain achievable by stimulated radiant energy emission from the maser medium contained within the cavity or resonator. Such systems have come to be known as "optical maser" systems or, in the case where the radiation is within certain wavelength ranges as "laser" systems. For purposes of the present invention the now well accepted acronym "laser" shall be taken to mean apparatus or devices for generating or amplifying such radiation.

One prior art optical maser arrangement has been disclosed in U.S. Patent No. 2,929,922 issued Mar. 22, 1960. The apparatus of that patent includes a quantity of maser material, herein referred to as a population inversion conditionable medium, bounded by two parallel reflecting surfaces. Optical frequency radiation is contained in such an apparatus by multiple reflections between the parallel mirrors. Such multiple reflection of the radiation through the population inversion conditionable medium gives rise to a high probability that the radiation will interact with atoms or molecules of the medium in a manner to induce transitions between a pair of energy levels with attendant stimulated emission of radiant energy.

The present invention is not restricted to any particular type of maser or laser material but may utilize substantially any population inversion conditionable medium, and specifically may use either three or four level maser materials. A typical three level maser utilizes an active material in which the atoms can exist in three or more energy conditions. Under ordinary or quiescent conditions, the population in each energy level of the material is dictated by the thermodynamic equilibrium condition. When such a material is "pumped" with radiant energy of a frequency corresponding to the difference between the lowest and highest of three different levels, an inverted distribution of excited states between a lower energy state and the ground level can be produced if a sufficient flux of pumping radiation is provided. That is, a non-equilibrium condition can be achieved in which a higher energy level has a greater population density of active particles than the number or density of particles in an adjacent lower energy level. A substance having such an inverted population condition will normally tend to return to its quiescent or equilibrium state with an attendant release of radiant energy. Two mechanisms are available for such return to equilibrium. Firstly, the substance may return to equilibrium by a mechanism commonly referred to as "spontaneous emission." This mechanism is normally undesirable in that it is random in nature and gives rise to non-coherent optical radiation which is commonly regarded as "noise." Secondly, the material can return to equilibrium by way of induced transition of the excited molecules or atoms. In this case the independent transitions are stimulated by the radiant energy of a beam (or standing wave) of coherent radiation within the optical cavity. Radiation produced as a result of induced transition is characteristically in-phase with the coherent standing wave and is added thereto in a manner to regeneratively amplify the standing wave.

When a maser or laser material is pumped to an excited state such that the density of upper energy level atoms greatly exceeds the density of lower energy level atoms, the power (rate of energy production) from stimulated emission is correspondingly increased. When the inverted population is high enough so that the power obtainable from stimulated emission exceeds the power losses within the optical cavity, the system can be made to oscillate. The maximum oscillatory amplitude obtainable is dependent upon the extent to which the regenerative power exceeds the losses. Likewise the rate at which oscillation builds up towards a maximum depends upon the relationship between power losses and the regenerative power of stimulated emission.

It has been shown heretofore that intense optical frequency radiation may be produced by laser apparatus which includes means for varying the effective reflectivity of the reflecting surfaces at the ends of the cavity or which includes other means for suddenly altering the loss characteristics of the cavity. One such prior art apparatus in which a conventional Kerr cell modulator was used for "Q-switching" of a conventional laser system is described in some detail in an article entitled, "Giant Optical Pulsations From Ruby," by F. J. McClung and R. W. Hellworth, Journal of Applied Physics, volume 33, No. 3 (March 1962). The foregoing article describes a system in which a rod-like synthetic ruby crystal is positioned in optical alignment with a Kerr cell switching device in an optical cavity bounded by a pair of reflector elements. The function of the Kerr cell modulator is to provide electrically controllable polarization of the polarization of the radiation within the cavity. By restricting regeneration to only that radiation conforming to a particular plane of polarization the effective attenuation per pass is increased so that such apparatus makes it possible to inhibit oscillation until a higher than normal inverted population condition is established. At an optimum time, relative to the period during which the laser material is pumped, the Kerr cell modulator may be suddenly deenergized to remove the polarization restriction and thereby permit low loss multiple transit between the parallel reflectors of all radiation produced by stimulated emission. When the Kerr cell modulator is suddenly deenergized the reduced attenuation enables a rapidly increasing stimulation of the upper energy atoms by the increased radiation passing through the medium. In effect, the "Q-switching" operation suddenly reduces the loss factor of the optical cavity so that oscillation builds up in a time of the order ½ microsecond to a peak power level of several hundred kilowatts or higher.

In such systems, it is necessary to space the reflecting surfaces a distance apart such that the optical length of the cavity is an integral multiple of a wavelength near the peak of the spectral response curve of the particular laser medium. The exact frequency or wavelength of the radiation emitted by such an apparatus is determined by the optical path length between the reflecting surfaces. Variation in any manner of the optical path length of the resonator during radiative operation will result in wavelength shifting or frequency modulation of the emitted radiation and therefore is to be avoided. Further, the emitted radiation will exhibit a percentage change or shift in wavelength $\Delta\lambda/\lambda$ directly proportional to any fractional or percentile change $\Delta n/n$ in the index of refraction of any system component through which the radiation passes. Thus, it is most desirable that variations in the refractivity of system components should be avoided or minimized.

Continued efforts by various workers in the art to utilize Q-switching systems such as that described above have revealed that such systems exhibit wavelength shifting during the duration of the high intensity output radiation. The present applicant has recognized and demonstrated that such frequency modulation results, not from inherent characteristics of the laser medium, but rather from effects which high intensity radiation may have on the index of refraction of the optically anisotropic materials used in devices such as conventional Kerr cell modulators and the like.

Accordingly, it is a primary object of the present invention to provide an improved apparatus for generation of coherent radiation which avoids the deleterious effects of high intensity optical radiation on optically anisotropic materials such as those commonly used in electrically controllable polarizers.

Another object of the invention is to provide an improved system and apparatus for generation of coherent and substantially monochromatic radiation having wavelengths in the ultramicrowave, infrared, visible, and ultraviolet regions of the electromagnetic spectrum.

It is another object to provide an improved apparatus which substantially eliminates time function frequency modulation or wavelength shifting of the output spectrum in optical maser systems.

A further object is to provide an improved optical maser system capable of generating radiation pulses of higher peak power than comparable prior art systems.

A still further object is to provide an improved coherent radiation generating system which is characterized by improvement in the efficiency with which input energy is converted to energy within a restricted wavelength range.

An additional object is to provide an improved Laser system of the "Q-modulation" type which substantially eliminates spectral broadening attributable to radiation induced variations in the refractivity index of system components.

It is a more general object of the invention to provide an optical maser apparatus capable of generation of radiation of enhanced peak power and improved monochromaticity.

The foregoing and other purposes and objects of the present invention will be more clearly apparent from the following description taken with the accompanying drawings, throughout which like reference characters indicate like reference parts, which drawing forms a part of this application and in which.

Figure 1:
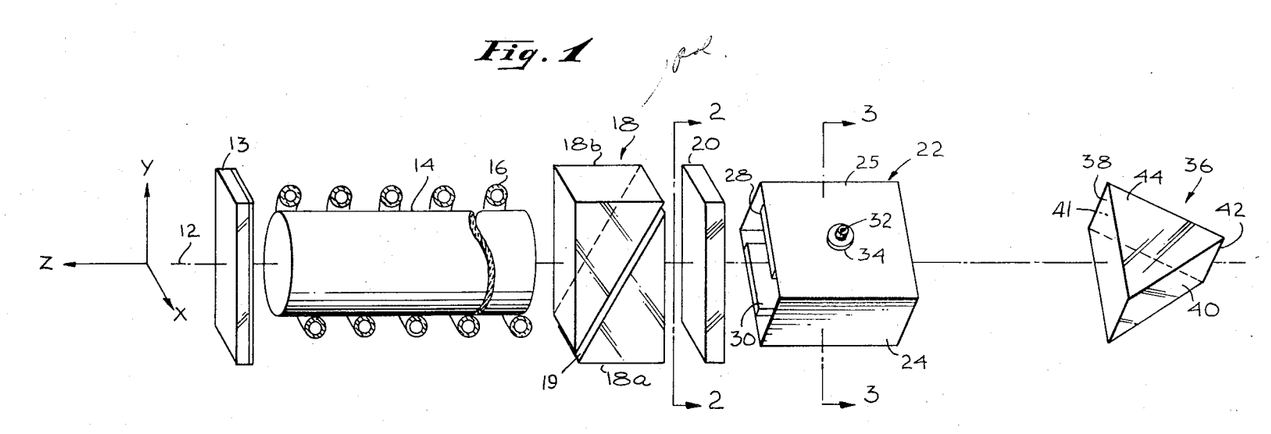
FIGURE 1 is a perspective view, partly in block diagram form, of a coherent radiation generator in accordance with the principles of this invention.

FIGURE 1 illustrates a system for generating high intensity pulses of optical frequency radiation which incorporates a novel arrangement for utilization of the previously known Q-switching concept. That concept, per se, is described, for example, in the above mentioned Journal of Applied Physics article. In the apparatus of FIGURE 1, the longitudinal axis of the optical cavity is indicated by the axial line 12 which defines a central axis of the radiation path or light path between a pair of reflecting elements 13 and 36. In accordance with the present invention, the reflecting element 36 preferably is a "roof prism" having triangular end surfaces 44 and a pair of "roof" surfaces 40 and 41. The two roof surfaces are mutually perpendicular with their common element being the roof line 42 which is parallel to the plane of the opposite surface 38. The planar rectangular surface 38 (which defines the hypotenuse of the triangular surfaces 44) is positioned normal to the axis 12 and therefore parallel to the X-Y plane. The end reflector 13 may comprise any one of various low loss reflecting surfaces conventionally used in similar prior art systems. It is only necessary to note that the reflector 13 must be capable of handling several megawatts of light without overheating. Between the end reflector 13 and the prism 36, the apparatus includes an inverted population conditionable element 14, a polarizing device 18, a polarization transforming plate 20 and a Kerr cell modulator 22, which elements are described in further detail immediately hereafter.

Various materials are known to be suitable for the use as the active or inverted population conditionable medium of optical maser systems of the general type described herein. For example, vapors of the alkali metals such as sodium, rubidium, cesium, lithium, and potassium as well as some solid rare earth salts may be used for the active medium of element 14. In accordance with the present invention, it is presently preferable to use a quantity of synthetic ruby in the form of a substantially cylindrical crystal having about 0.04% by weight chromium concentration. Such synthetic ruby as well as other substances capable of operation as an inverted population conditionable medium are fully treated in the prior art literature (e.g. Proceedings of the IEEE, volume 51, January 1963). Accordingly, the composition of materials suitable for use in optical maser systems and the Quantum Electronics Theory of stimulated emission of radiation from such substances is not belabored herein.

For the purpose of establishing an inverted population condition in the laser medium of element 14, the cylindrical rod is peripherally encompassed by a pumping lamp 16 formed in the shape of a spiral. The spiral lamp 16 may be electrically energized in accordance with conventional practice by a lamp energizing potential source (not shown) connected across the ends of the lamp. The cylindrical rod 14 is, of course, positioned coaxially with the central axis 12 of the light path. Adjacent to the right hand end of the laser rod 14, as illustrated in FIGURE 1, is located a polarizing means which preferably comprises a pair of air spaced calcite prisms 18a and 18b known in the art as a Glan polarizer. In this type of polarizer, the optic axis of the material is parallel to the entrance face, and perpendicular to the line formed by the intersection of the plane of the entrance face and plane of angular face. This arrangement yields maximum transmission for rays whose E vector is parallel to the optic axis due to the close proximity of the Brewster angle to the critical angle of the rejected ray (i.e. the ray whose electric vector is perpendicular to the optic axis). Glan polarizing prisms are preferred over other types (such as a Nichol or Glan-Thompson) since experience has shown that neither cement nor oil films are capable of withstanding the multimegawatt optical energy density levels which can be produced by these laser systems.

As stated above, the purpose and function of prism 18 is to provide rejection from the optical cavity of all radiation except that which is plane polarized in the Y-axis direction. In practice this is achieved by selecting a doubly refractive material such as calcite and properly orienting the crystal axis (i.e. direction of propagation having no double refraction) relative to the direction of propagation of the radiation and direction of polarization of the transmitted and rejected rays. This is achieved with prism 18 by orienting the angular surface 19 so that radiation propagating along the axis 12 and polarized with electric vector parallel to the X direction is reflected at the interface 19 due to the fact that the angle of incidence is less than the critical angle, while radiation whose electric vector is parallel to Y direction is transmitted due to the fact that its angle of incidence is less than the critical angle. In the terminology of crystal optics, the type of Glan polarizer shown in FIGURE 1 rejects the extraordinary ray (i.e. critical angle at 6943 A. of $\theta \sim 37.2°$) and transmits the ordinary ray (i.e. $\theta_c \sim 42.4°$ at 6943 A.). Enhanced transmission of this type of polarizer is achieved by close proximity of the Brewster angle ordinary ray (i.e. $\theta_B \simeq 34°$) to the critical angle of the extraordinary ray.

Figures 2, 3:
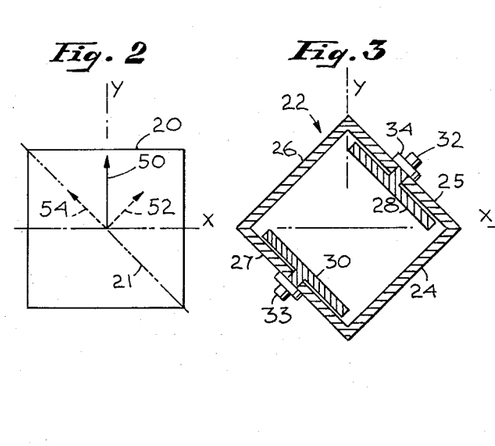
FIGURE 2 is a cross-sectional view taken along the transverse plane 2—2 of FIGURE 1.
FIGURE 3 is a cross-sectional view taken along lines 3—3 of FIGURE 1.

Closely adjacent the right hand end of the prism 18 there is provided a polarization transforming means which preferably takes the form of a conventional quarter wave plate 20. The characteristics and functions of such plates are well known in the art. For the purposes of the present invention, it is only necessary to observe that the plate 20 is oriented normal to the central axis 12 and rotationally about the axis 12 to a position such that the line 21 of maximum retardation of the plate (FIGURE 2) is at an angle of 45° relative to the Y-axis and therefore extends diagonally through the second and fourth quadrants. The Kerr cell modulator 22 is positioned in alignment with axis 12 between the polarization transforming plate 20 and the roof prism 36. As best shown in FIGURE 3, the Kerr cell modulator 22 is positioned rotationally about the axis 12 so that conductive plates 28 and 30 are at 45° angles relative to the Y-axis, and so that the line normal to plates 28 and 30 is perpendicular to the maximum retardation line 21 of plate 20. The Kerr cell modulator is preferably a box-like structure comprising rectangular side walls 24, 25 and 26 and 27, with the opposite side walls 25 and 27 supporting the conductive plates 28 and 30, and with electric terminals 32 extending outwardly from the plates through the walls 25 and 27 to enable application of biasing potential to the plates. The interior of the Kerr cell modulator between the plates 28 and 30 is conventionally filled with an optically anisotropic material having dipolar molecules which tend to align themselves parallel to an applied electric gradient between the plates 28 and 30. Within the scope of the present invention the modulator 22 may be filled with any one of various optically anisotropic fluids such as nitrobenzene, nitrotoluene, chlorobenzene or carbon disulfide ($CS_2$). The Kerr cell necessarily includes radiation transmissive end walls (not shown) for retaining the anisotropic fluid therewithin.

A cycle of operation of the apparatus of FIGURE 1 begins with the laser rod 14 unenergized and in a normal or unpumped condition. Firstly, the Kerr cell modulator 22 is "closed" (rendered effective to retard certain radiation components) by application of a fixed biasing voltage to the plates 28, 30 via terminals 32 and 33. The biasing voltage preferably is supplied from a conventional DC source a current limiting resistance (not shown). In addition, a high voltage switch such as a thyratron, spark gap, or avalanche transistor is connected in a low inductance configuration across terminals to provide a "crowbar" shorting means for deenergizing the Kerr cell in a time of the order of .001 microsecond.

The pump lamp 16 is then energized in the usual manner for a period of about 250 microseconds to establish an inverted population condition within the laser rod 14. That is, pumping by means of radiant energy from lamp 16 excites the active media of the rod 14 to establish a preponderance of the atoms or molecules in an upper energy state. When such a state exists the rod 14 is capable of induced emission of coherent radiation in response to stimulation of the upper energy state atoms or molecules by impinging radiation. However, so long as the modulator 22 is "closed" stimulation of the laser rod 14 into cascade transition will not take place. There will be a relatively minor amount of emission of radiation caused by spontaneous transition of atoms to the lower energy level. Rays which so originate, and which pass generally parallel to the longitudinal axis 12 through the prism 18 are polarized by the prism. Specifically, prism 18 ejects substantially all electromagnetic wave components except components having their E-field vector aligned parallel to the Y-axis. Wave components having such alignment pass through the prism 18 and therefrom to the retarder plate 20. As best shown in FIGURE 2, this plate preferably is oriented so that its line 21 of maximum retardation is approximately at 45° relative to the Y-axis. When the plate 20 is so oriented its effect on vertically plane-polarized wave components is to transform the same to left-hand elliptically or circularly polarized waves. This action of the plate 20 may be best understood by considering that the E-field vector 50 (FIGURE 2) of a wave passing through plate 20 can be regarded as consisting of vector components 52 and 54 oriented respectively normal to and parallel to the line 21 of maximum retardation of the plate 20. When these two mutually perpendicular and substantially equal components 52 and 54 pass through the plate 20, component 54 is retarded or phase delayed by a quarter of a period relative to component 52. This action of course conforms to the classical definition of circular or elliptical polarization, and the result is an output radiation wave, passing from plate 20 toward modulation means 22, which wave is left-hand circularly (or elliptically) polarized with the degree of ellipticity depending upon the inequality, if any of the components 52 and 54.

The circularly polarized radiation in traversing the Kerr cell modulator 22 is affected thereby only so long as the cell 22 is electrically biased. When so biased the cell 22 retards the component of the wave which is perpendicular to the plates 28 and 30 (i.e. vector component 52) to a greater extent than the component 54. Preferably, the modulator 22 is dimensioned and sufficiently biased to provide a differential retardation of one quarter of a period at the optical frequency of the system. Thus, the vector components 52 and 54, which are in phase quadrature at the entrance to Kerr cell modulator 22, exit from the cell in phase coincidence. This action of the "closed" Kerr cell shutter is retransformation of the circularly polarized light back to linearly polarized radiation having its E-field vector in the vertical (Y-axis) direction.

Figure 4A:
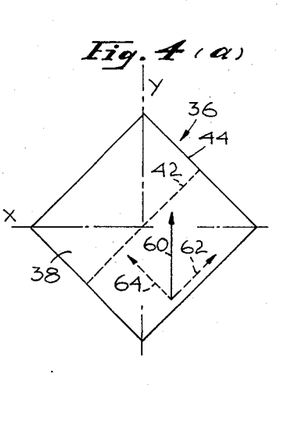
FIGURE 4a and 4b are similar diagrammatic illustrations of a portion of the apparatus of FIGURE 1.
Figure 4B:
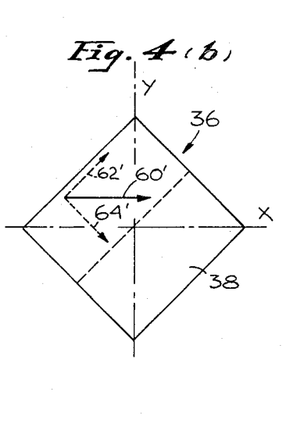

It is essential at this point in the analysis of the operation to observe that the "roof-line" 42 of the prism 36 is at a 45° angle relative to the X and Y axes (and hence lies in the plane normal to the plates 28 and 30 of the Kerr cell modulator 22). The foregoing structural relationship is best shown in FIGURES 4a and 4b which are identical views of the prism 36 as seen from the position of the Kerr cell modulator 22 and looking along the longitudinal axis 12. As best shown in FIGURE 4a, the vertically polarized wave, represented by E-field vector 60, enters the prism through and normal to planar face 38 and suffers double reflection (and therefore an image rotation) at the oblique surfaces 40 and 41. More specifically, the wave vector 60 may be considered as comprising quadrature vector components 62 and 64 respectively parallel to and normal to the prism roof line 42. Since the component 62 is parallel to the oblique surface 40 of the prism it is reflected therefrom and from oblique surface 41 without angular change, and emerges from the prism as represented at 62' in FIGURE 4b. On the other hand, component 64 being oblique (45°) relative to surface 40 is effectively rotated through an angle of 90° at each of the oblique surfaces 40 and 41. Thus, the E-field vector component 64', as it emerges from the prism, is reversed relative to the in-going component 64. The composite effect of the prism 36 on an axially impinging vertically polarized wave 60 is to transform the same into a horizontally polarized wave 60' travelling in the reverse direction (from right to left along the longitudinal axis 12 of FIGURE 1).

In returning through the energized Kerr cell modulator 22 the horizontally polarized wave 60' suffers a quarter-period retardation of the vector component which is normal to the plates 28 and 30. Accordingly as the wave emerges from the left end of the Kerr cell modulator, vector component 64' leads component 62' by a phase angle of 90 electrical degrees. The quadrature phase relation of the E-field vector components means that the wave is circularly polarized. Quarter wave plate 20 retards that component of the returning wave which is parallel to line 21. Thus, vector component 64' is delayed one quarter period relative to component 62' in passing through the plate 20, and the components emerge therefrom in time coincidence. In essence, then, the function and effect of plate 20 is retransformation of the wave to linearly polarized form with the E-field vector in the horizontal (X-axis) direction. As stated heretofore, the normal purpose and function of the polarizer prism 18 is to reject horizontally polarized waves while transmitting vertically polarized components. As noted above, the returning wave has its E-field vector parallel to the X-axis and therefore parallel to the cleavage plane 19 of the polarizer prism 18. Accordingly, the returning wave 60' is substantially completely rejected by prism 18. So long as the Kerr cell modulator 22 is fully energized substantially none of the returning radiation is permitted to pass through the laser rod 14. By this arrangement the modulator 22 serves as a shutter or "Q switching" device to keep the composite gain of the optical cavity below the critical value of 1.0, thereby inhibiting cascade transition of the laser media atoms from the upper to the lower energy level. Accordingly, the system cannot go into stimulated oscillation and pumping may be continued until an exceptionally high inverted population condition is attained.

Near the end of the normal pumping period, when a desired population inversion in the laser rod 14 has been achieved, the DC energizing potential is quickly removed by closure of a short circuiting switch (not shown) which is connected, as previously mentioned, across terminals 32 and 33. Deenergization of the Kerr cell opens the optical path therethrough to permit multiple reflective translation of radiation between the end reflector 13 and the prism 36. Repeated passage of optical frequency waves through the rod 14 results in induced transition of upper energy level chromium atoms to a lower energy level and consequent emission of radiation. This process rapidly regenerates until an intense beam of radiation involving several megawatts exists between the reflector 13 and the prism 36. Since dielectric reflecting surfaces such as reflector 13 normally have a transmissivity of less than 10%, the transmitted fraction of the generated radiation is readily available for utilization outside the illustrated optical cavity.

In the foregoing, it has been briefly mentioned that deenergization of the Kerr cell modulator 22 permits multiple reflection regeneration. Complete understanding of the operation of the optical path during this "ON" condition of the modulator perhaps requires the following detailed consideration.

As stated heretofore, radiation which spontaneously emanates from the negative temperature media of laser rod 14 is polarized by prism 18 in a polarization direction parallel to the Y-axis. Such linearly polarized radiation is transformed to left-hand elliptically polarized waves by quarter-wave plate 20, and enters the Kerr cell modulator 22 in that form. When there is no biasing voltage applied between plates 28 and 30 of the Kerr cell modulator the nitrobenzene molecules therein are randomly positioned and hence the nitrobenzene initially has no optical effect on radiation waves passing therethrough. Accordingly, the left-hand circularly or elliptically polarized waves from plate 20 pass through the modulator 22 without change and are doubly reflected by the roof prism 36. At the first reflection (e.g. surface 40), the light is changed to right-hand circular polarization, and at the second reflection it changes back. This beam inversion and direction reversing characteristic function of the roof prism 36 is well understood in the art. Accordingly, it is only necessary here to observe that when the Kerr cell modulator 22 is "ON" (shutter open) the radiation entering the roof prism through surface 38 is circularly polarized. Accordingly, prism 36 does not alter the polarization characteristics of the light beam. The returning left-hand circularly polarized light passes unchanged through the Kerr cell and is transformed into vertically polarized light by the quarter-wave plate 20. The Glan prism 18, in the orientation shown in FIGURE 1, passes vertically polarized light. Therefore, all of the returning radiation passes freely through prism 18, system losses are minimum, and oscillation can take place.

It should be especially noted at this point that under the above described "shutter open" conditions, substantially all radiation passing through the modulator 22 is circularly polarized. That is, the E-field vector rotates at the optical frequency. Accordingly, the nitrobenzene or other optically anisotropic material contained within modulator 22 is not subjected to strong single direction electric fields regardless of how intense the radiation becomes. Hence, the nitrobenzene molecules, although electrically dipolar, will not align with the optical electric fields, and the intense laser radiation beam does not modify the index of refraction or propagation velocity of the nitrobenzene.

Figures 5, 6, 7, 8:
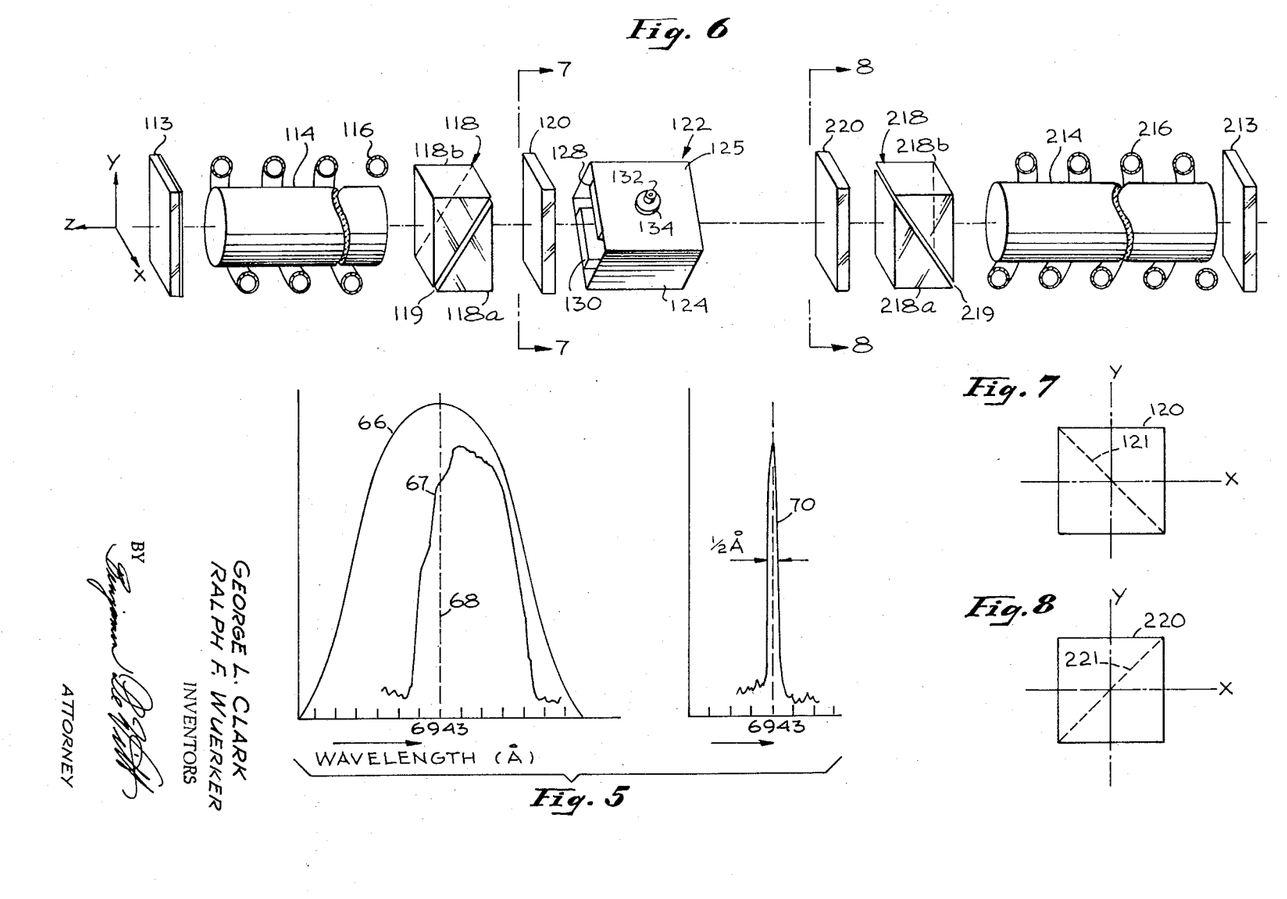
FIGURE 5 is a plurality of curves illustrating certain spectral characteristics of apparatus of the general type to which the present invention relates.
FIGURE 6 is a perspective view partly in block diagram form of a further embodiment of a generator in accordance with the principles of this invention.
FIGURES 7 and 8 are cross-sectional views taken respectively along the lines 7—7 and 8—8 of FIGURE 6.

As stated heretofore, frequency modulation in shuttered laser systems is normally due to the effect of the intense radiation on the index of refraction of the nitrobenzene or other optically anisotropic media contained within the shutter mechanism. That characteristic is illustrated in FIGURE 5 wherein curve 66 indicates the fluorescence spectrum of laser quality ruby having a concentration by weight of about 0.04% chromium. Previous workers in the art have found that Kerr cell shuttered systems using such material consistently produce a gross output spectrum substantially as indicated by the curve 67. It is to be noted that curve 67 represents distribution of the output radiation over a wavelength range of about 10–12 angstroms and a severe degradation of the intensity or radiant power at the center frequency 68. Applicant has recognized that curve 67 does not in fact indicate a true spectral broadening but rather is the result of time function wavelength shifting or cavity mode shifting. That is, at any given instant, the laser system output power is concentrated within a narrow band about ½ to one angstrom wide. In the prior art systems using Kerr cell modulators that narrow spectrum has moved across the region indicated by the curve 67 during the period of the system output pulse. In accordance with the present invention such time function wavelength shifting is substantially eliminated. Thus, an apparatus in accordance with the invention produces substantially monochromatic optical frequency radiation with the output energy being concentrated within a wavelength range less than one angstrom in width. This characteristic of apparatus in accordance with the present invention is illustrated by curve 70 of FIGURE 5.

When the Kerr cell modulator 22 is energized, the radiation passing therethrough is at least partly linearly polarized thereby. However, the system is now operating in a manner such that prism 18 ejects all light which returns to it from prism 36. Accordingly, the optical path has a relatively very high loss factor and will not oscillate. In the absence of oscillation, the radiation intensity in the cavity is insufficient to significantly affect the refractivity index of the modulator fluid. On the other hand, when the Kerr cell modulator 22 is not energized the entire light beam passing therethrough is circularly polarized. Even though the intense optical electric fields exert torques on the dipolar molecules of the optically anisotropic liquid of the Kerr cell the molecules cannot rotate rapidly enough to maintain alignment with the rotating electric field vector of the circularly polarized radiation. Thus, there is no appreciable molecular orientation of the Kerr cell liquid, no resulting radiation induced variation in the refractivity index of the liquid, and therefore, no wavelength shifting of the laser system output radiation.

FIGURE 6 illustrates a further embodiment in accordance with the present invention in which two laser rods 114 and 214 are aligned in spaced apart relation along the longitudinal axis 112. In the apparatus of this embodiment, the elements 113 through 120 preferably are substantially identical to the elements 13 through 20 of the apparatus of FIGURE 1 and therefore need not be again described in particular detail. Moreover, the apparatus of FIGURE 6 is symmetrical about the vertical center line of the Kerr cell modulator 122 (the assembly comprising elements 213 through 220 is a mirror image of the assembly comprising elements 113 through 120). The foregoing similarities are emphasized in the drawings by the use of the 100 series reference characters in the left-hand portion of FIGURE 6 and the 200 series reference characters in the right-hand portion of FIGURE 6.

In the apparatus of FIGURE 6, Kerr cell modulator 122, similar to the modulator 22 of the apparatus of FIGURE 1, is centrally positioned between the first and second laser rods 114 and 214. The modulator 122 is angularly positioned about the central axis 112 so that the planar conductive plates 128 and 130 lie at 45° angles relative to the X and Y axes. That angular orientation is the same as illustrated in FIGURE 3; that is, a cross-sectional view of the modulator 122 of FIGURE 6 would be identical to FIGURE 3. Between the Kerr cell modulator 122 and the first laser rod 114 are located, in the order named, a quarter wave plate 120 and an air spaced Glan polarizer prism 118 which elements are respectively identical to the elements 20 and 18 of the apparatus of FIGURE 1. The radiation path of the apparatus of FIGURE 6 is bounded by end reflecting elements 113 and 213 which may be low loss high reflectivity devices similar to the element 13 of FIGURE 1. The embodiment illustrated in FIGURE 6 is similar to the apparatus of FIGURE 1 in that the only high intensity radiation which is permitted to pass through the Kerr cell modulator 122 is circularly polarized. When the Kerr cell modulator 122 is energized so that the light path is effectively shuttered to prevent transmission between the two laser rods 114 and 214 no high intensity radiation is generated by the system or passed through the liquid contained within the modulator. When the Kerr cell modulator is deenergized (i.e. short circuited) to provide an "open shutter" operational mode, the system operates in a manner to circularly polarize all waves before they pass through the modulator. By that arrangement, radiation induced orientation of the Kerr cell liquid is avoided and consequent variations in the refractivity index are substantially eliminated.

More specifically, in the operation of the apparatus of FIGURE 6, the two laser rods are simultaneously optically pumped by light from the corresponding pumping lamps 116 and 216. During the greater part of the pumping interval, the Kerr cell modulator 122 is electrically energized to maintain the system in a "shutter closed" condition. Ideally the Kerr cell bias potential should be just sufficient to cause it to have an optical effect similar to that of a half wave plate (i.e. transforms left circularly polarized light to right circularly polarized, and vice versa). With the modulator 122 energized the operation is substantially as follows. A light ray originating for example, in laser rod 114 is vertically polarized by prism 118, is converted to circular polarization by plate 120 and passes therefrom to the modulator 122. The DC bias potential applied to plates 128 and 130 provides a static electric field between the plates. That field induces electronic polarization of the molecules of anisotropic fluid within the Kerr cell modulator. The polarized molecules rotate into alignment with the applied static electric field and thereby present to the light wave traversing the cell a medium which retards the wave component which is perpendicular to the plates 128 and 130 by a half wavelength. Accordingly, the modulator 122, so long as it is electrically energized, operates to transform the left circular polarized light to right circularly polarized light. The right circularly polarized wave from the right end of modulator 122 is converted to horizontally polarized wave by plate 221 and enters prism 218 where all horizontally polarized components are ejected from the system. Thus the system operates, when in the "shutter closed" mode, to doubly attenuate all radiation passing from laser rod 114 to rod 214 or vice versa. Accordingly, the rods 114 and 214 can be pumped to population inversions far exceeding the levels achievable in conventional non-shuttered laser systems.

In connection with the foregoing, it should be particularly noted that the Kerr cell modulator 122 (FIGURE 6) provides a wave retardation differential of a half wavelength or ½ period at the optical frequency of the system, whereas the corresponding modulator 22 of the apparatus of FIGURE 1 preferably introduces a wave retardation differential of one quarter wavelength. Structurally the modulator 122 (FIGURE 6) may be identical to modulator 22 (FIGURE 1). The increase from quarter wavelength to half wavelength retardation merely requires a larger biasing potential. For example, we have successfuly used a Kerr cell modulator having a length of 1⅜" along the axis 12 and a spacing of ½" between the plates 28 and 30. With those dimensions, and using nitrobenzene in the cell, a biasing potential of about 20 kilovolts gives quarter wavelength differential retardation of the wave component which is normal to the plates, thereby satisfying the function required of the Kerr cell modulator 22 in the system of FIGURE 1. With a Kerr cell of precisely the same dimensions, we have found that a biasing potential of 28.3 kilovolts gives half wavelength differential retardation and, hence, satisfies the operative requirements of the system illustrated in FIGURE 6.

Near the end of the pumping interval, the Kerr cell modulator 122 is suddenly switched to the unenergized or "shutter open" condition, to thereby permit multiple reflective translation of radiation waves between the reflecting elements 113 and 213. As stated heretofore, in connection with the apparatus of FIGURE 1, spontaneous emission initially provides a relatively feeble light ray which passes from the rod 114 to the polarizing prism 118. Prism 118 discards or ejects horizontally polarized wave components and permits translation of vertically polarized components. Quarter wave plate 120 converts the vertically polarized wave to a circularly polarized wave in the same manner as described in detail in connection with the element 20 of the apparatus of FIGURE 1. The circularly polarized radiation passes through the Kerr cell modulator 122 and, since the modulator is not energized, the wave is unaffected thereby. As best shown in FIGURE 7 the maximum retardation line 121 of the quarter wave plate 120 extends diagonally of the plate through the second and fourth quadrants at an angle of 45° with respect to the Y-axis. In contrast, as shown in FIGURE 8, the line 221 of maximum retardation of the quarter wave plate 220 extends diagonally through the first and third quadrants at a 45° angle with respect to the Y-axis. Accordingly, the quarter wave plate 220 has an effect precisely opposite that of the plate 120 and converts the circularly polarized radiation back to a wave which is linearly polarized in the vertical or Y-axis direction. This vertically polarized radiation passes through the second Glan prism 218 without attenuation and thence through the second laser rod 214 wherein the impinging radiation stimulates transition of pumped atoms or molecules from the upper energy level. As usual, this induced transition produces radiant energy which is coherent with the impinging radiation. Accordingly, the wave is amplified by the laser action as it passes through the rod 214 and again as it retraverses the rod after reflection from the end reflecting element 213. During each traversal of the light path, the wave is amplified by rod 214, is then converted to circularly polarized light by the combination comprising prism 218 and quarter wave plate 220, is reconverted to linearly polarized light by the polarization converter comprising plate 120 and prism 118. The wave is again amplified during translation through the rod 114, and is reflected by reflecting element 113 to repeat the sequence. In many applications, the apparatus of FIGURE 6 may be relatively very advantageous in that the use of two laser rods doubles the amount of energy which may be stored by optical pumping. Since the energy storage is doubled the optical gain obtainable is squared.

As generally described heretofore in connection with the apparatus of FIGURE 1, the system illustrated in FIGURE 6 restricts the light passing through the Kerr cell modulator 122 to circularly or elliptically polarized components. That restriction prevents orientation of the Kerr cell liquid molecules by the intense electric fields of the laser radiation. Accordingly, radiation induced variations in the refractivity index of the Kerr cell liquid are avoided or at least minimized and the effective optical length of the optical cavity between reflecting elements 113 and 213 is thereby stabilized. Thus the system of FIGURE 6 eliminates the radiation induced frequency modulation which has been observed in prior art "shuttered" laser systems. In addition, the apparatus of the embodiments illustrated in FIGURES 1 and 6 also greatly reduces the Raman scattering of laser light which has been observed in systems utilizing nitrobenzene and similar optically anisotropic liquids.

While the illustrated embodiments of the present invention have been described as pulse generating systems, it is to be understood that the invention in its broader aspects is not so restricted. Rather the principles and concepts are applicable to any system which utilizes an electrically controllable polarizer or attenuator such as a Kerr cell or the like for switching, modulating, stabilizing or otherwise amplitude regulating the radiant energy intensity within the radiation path of an optical frequency radiation generator of the optical maser or "laser" type. For example, one such system to which the concepts of the present invention may be applied for enabling automatic intensity control is disclosed in detail in an article by F. R. Marshall and D. I. Roberts, entitled "Use of Electro Optical Shutters to Stabilize Ruby Laser Operation" Proc. of IRE, 50, 2108 (1962).

It has been shown that various embodiments of the present invention are useful for generation and amplification of coherent radiation within the infrared, visible and ultraviolet wavelength ranges. As is now well understood in the art, optical maser systems of the general type to the present invention is applicable have a wide variety of uses in the communications field as well as in spectroscopy and various other scientific measuring and testing applications. Thus the present invention is not to be regarded as restricted to any particular application or end use.

While the present invention has been described with reference to certain specific embodiments only, it will be obvious to those skilled in the art that it is not so limited but is susceptible to various changes and modifications without departing from the spirit and scope of the invention. For example, the invention is not limited to any particular frequency or wavelength but encompasses the entire optical frequency radiation portion of the electromagnetic spectrum and, as noted heretofore, may utilize any one of various known optical maser materials which are capable of being pumped to an inverted distribution of excited states.

The embodiments of the invention in which an exclusive property or privilege is claimed are defined as follows:

1. An optical maser system comprising:
    a multiple reflection radiation path bounded at its respective ends by a pair of radiation reflecting elements;
    a quantity of a population inversion conditionable substance located within said path;
    polarization means located within said path adjacent said substance for translating along said path substantially only those portions of the radiation emanating from said substance which are plane polarized in a predetermined direction;
    shutter means located within said path including a media having electrically orientable optically anisotropic molecules and which is electrically biasable at least first and second bias conditions, with said first condition being such that radiation passing through said media is substantially unaffected and with said second condition being such that said media converts plane polarized radiation to circular polarization and vice versa;
    and means located in said path between said polarization means and said shutter means for converting plane polarized portions which are passed by said polarization means to circular polarization to thereby avoid radiation induced orientation of the molecules of the media of said shutter means.

2. Apparatus for coherently generating electromagnetic waves comprising:
    an electromagnetic wave transmission means dimensioned for resonance at a predetermined frequency;
    an inverted population conditionable substance characterized in that it is capable of transition between first and second energy levels with such transition being accompanied by emission of electromagnetic radiation within a frequency range which includes said predetermined frequency;
    polarization means within said transmission means for restricting the transmissivity of same to plane polarized wave components having E-field vectors aligned in a predetermined direction transverse to the direction of wave propagation;
    an electrically controllable means aligned with said polarization means along the direction of wave propagation for selectively altering the polarization of waves passing therethrough;
    and means in the radiation path between said polarization means and said electrically controllable means for converting plane polarized radiation to circularly polarized radiation so that variations of the index of refraction of the material of said electrically controllable means which tend to arise from molecular orientation of the same by the radiation passing therethrough are minimized.

3. An apparatus in accordance with claim 2 in which said electrically controllable means comprises a cell having a pair of spaced apart substantially planar electrodes with the space between said electrodes being filled with a substance having optically anisotropic electrically polarizable molecules.

4. An apparatus in accordance with claim 3 in which said anisotropic substance is selected from the class consisting of nitrobenzene, nitrotoluene, chlorobenzene, and carbon disulfide.

5. Apparatus for generating coherent optical frequency electromagnetic waves, comprising:
a wave translation means dimensioned to resonate substantially at a predetermined frequency within the optical wave lengths portion of the spectrum;
a population inversion conditionable substance positioned within said means and capable of molecular transition accompanied by emission of radiation of a wavelength corresponding to said predetermined frequency;
polarization means positioned adjacent said substance within said wave translation means for through-transmitting substantially only those portions of the radiation emitted by said substance which have E-field vectors oriented in a predetermined transverse direction relative to the direction of propagation of the radiation;
an electrically controllable means for selective retardation of electromagnetic waves passed therethrough, positioned in alignment with said polarization means along said direction of propagation, said controllable means including a material having optically anisotropic molecules which exhibits molecular orientation when subjected to intense electric fields with such orientation giving rise to undesired variations in the index of refraction of the material; and
means in the radiation path between said polarization means and said controllable means for converting the plane polarized radiation passed by said polarization means to circularly polarized radiation passing through said controllable means so that the direction of polarization of the radiation applied to said material varies continuously as a function of time at a rate substantially exceeding the maximum rate of variation at which appreciable molecular orientation of said material can occur.

6. In an apparatus for generating intense coherent radiation by stimulated emission of radiation from a substance capable of transition between a pair of energy states, the combination of:
a wave transmission path bounded at its ends by first and second means for reversing the direction of propagation of rays impinging thereon;
a quantity of said transitionable substance positioned within said path, and adapted to be stimulated-to-emit by radiation passing therealong;
plane polarization means within said wave translation path positioned to intercept radiation emanating from said substance for passing along said path substantially only those portions of said radiation which have the E-field vector oriented in a predetermined transverse direction relative to said path;
electrically controllable means positioned in said path between said polarization means and said first reversing means for controllably inhibiting regenerative propagation of emitted radiation between said first and second reversing means, said controllable means including a medium having electromagnetically anisotropic molecules and which exhibits molecular orientation when subjected to intense electromagnetic fields which remain polarized in one direction for a time longer than that required for the molecules of the medium to rotate, with such orientation giving rise to an apparent increase in the index of refraction of the medium; and
a quarter-wave retarder positioned between said polarization means and said controllable means with the line of maximum retardation of same being positioned at substantially 45° relative to said predetermined direction for converting the plane polarized radiation from said polarization means to elliptically polarized radiation traversing applied to said controllable means so that the E-field vector of the coherent waves passing through said medium rotates continuously at a rate precluding radiation induced variation of the refractivity index of said medium.

7. In a laser system:
a light path bounded by a pair of reflectors;
a quantity of a substance capable of radiation induced transition between a pair of energy states, said quantity being positioned in said path;
a Glan prism positioned within said light path to transmit along said path substantially only that light which is polarized in a predetermined transverse direction;
a Kerr cell including an optically anisotropic medium positioned in said path between said prism and one of said reflectors with said medium being characterized in that its refractivity index increases in response to prolonged subjection to the electric fields of high intensity plane polarized light; and
a quarter wave retardation plate positioned between said prism and said Kerr cell for converting plane polarized light to elliptical polarization before transmission through said cell.

8. An optical maser system comprising:
a multiple reflection radiation path bounded at its respective ends by a pair of radiation reflecting elements;
a quantity of a population inversion conditionable substance located within said path;
shutter means within said path including a media having electrically orientable optically anisotropic molecules and which is electrically biasable to at least first and second bias conditions, with said first condition being such that radiation passing through said media is substantially unaffected and with said second condition being such that said media converts plane polarized radiation to circular polarization and vice-versa;
and means located in said radiation path between said substance and said shutter means for restricting the optical transmissivity of said path in a manner such that coherent radiation waves produced by stimulated emission from said substance are converted to circularly polarized radiation before traversing said shutter means.

9. Apparatus in accordance with claim 8 in which said last mentioned means comprises in combination:
a Glan polarizing prism;
and a quarter wavelength retarder plate having its line of maximum retardation aligned at an angle of about 45° relative to the direction of polarization of said prism.

10. In a laser system:
a light path bounded at its ends by a pair of reflectors;
first and second laser rods aligned in said path and each comprising a substance capable of radiation induced transition between a pair of energy states;
a Kerr cell shutter including an optically anisotropic medium positioned in optical alignment with and between the adjacent ends of said laser rods; and
means disposed between each of said rods and said shutter for restricting the transmission of light through said shutter to substantially only elliptically polarized radiation to thereby avoid molecular orientation of said medium which would otherwise be caused by prolonged exposure to the electric fields of plane polarized radiation.

References Cited

UNITED STATES PATENTS

| | | | |
|---|---|---|---|
| 2,002,515 | 5/1935 | Worrall | 88—61 X |
| 3,242,440 | 3/1966 | Koester et al. | 331—94.5 |

OTHER REFERENCES

Marshall, F. R., and Roberts, D.L. Proceedings of the IRE, Vol. 50, No. 12, October 1962, page 2108.

Buhrer, C. F., and Bloom, L. R., Proceedings of the IRE, Vol. 50, No. 12, December 1962, page 2492.

Brown, E. B., "Modern Optics," Reinhold Publishing Corp., New York, page 58, QC 355 B8.

DAVID H. RUBIN, Primary Examiner.

JEWELL H. PEDERSEN, Examiner.

P. R. MILLER, Assistant Examiner.

UNITED STATES PATENT OFFICE
CERTIFICATE OF CORRECTION

Patent No. 3,373,376                                             March 12, 1968

George L. Clark et al.

It is certified that error appears in the above identified patent and that said Letters Patent are hereby corrected as shown below:

Column 1, lines 43 and 44, "require", should read -- requirement --. Column 4, line 49, before "use" cancel "the". Column 10, line 58, "successfuly" should read -- successfully --. Column 12, line 43, after "biasable" insert -- to --. Column 13, line 64, "translation" should read -- transmission --.

Signed and sealed this 29th day of July 1969.

(SEAL)
Attest:

Edward M. Fletcher, Jr.                              WILLIAM E. SCHUYLER, JR.
Attesting Officer                                       Commissioner of Patents